C. P. GRIMES.
CARBURETER.
APPLICATION FILED OCT. 23, 1911.
1,052,051.
Patented Feb. 4, 1913.
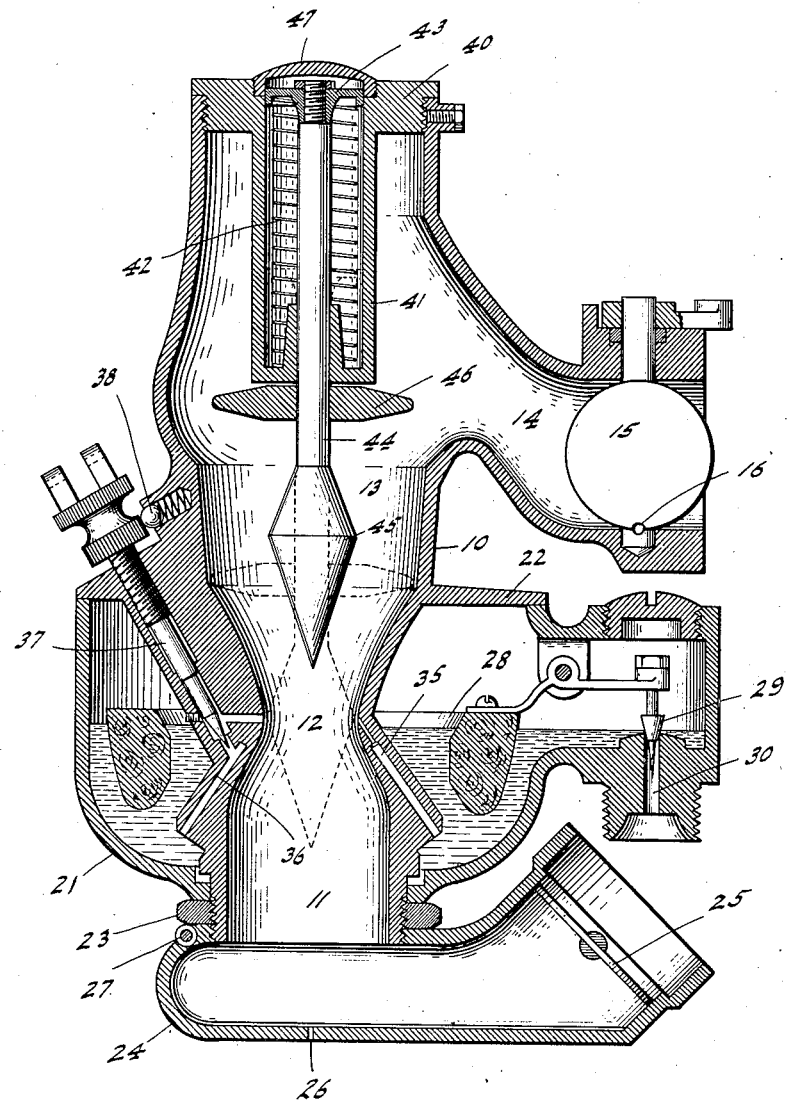
Witnesses
Frank A. Fahle
M. ——
Inventor
Charles P. Grimes,
By Arthur M. Hood
Attorney

UNITED STATES PATENT OFFICE.

CHARLES P. GRIMES, OF INDIANAPOLIS, INDIANA, ASSIGNOR TO WHEELER & SCHEBLER, A COPARTNERSHIP COMPOSED OF FRANK H. WHEELER AND GEORGE M. SCHEBLER, BOTH OF INDIANAPOLIS, INDIANA.

CARBURETER.

1,052,051.      Specification of Letters Patent.      Patented Feb. 4, 1913.

Application filed October 23, 1911. Serial No. 656,244.

*To all whom it may concern:*

Be it known that I, CHARLES P. GRIMES, a citizen of the United States, residing at Indianapolis, in the county of Marion and State of Indiana, have invented a new and useful Carbureter, of which the following is a specification.

My invention relates to carbureters, and has for its object the production of a proper mixture of air and gasolene vapor for varying speeds of internal combustion engines.

My invention comprises a number of novel features, which will appear from the description and drawing and will be particularly pointed out in the claims.

The single figure of the drawing is a vertical section through a carbureter embodying my invention.

The main body 10 of the carbureter is provided with a central vertical passageway 11, which flares in smooth curves both upwardly and downwardly from an intermediate contracted portion 12, where the gasolene is admitted. The upper end of the passage 11 comprises an inverted frusto conical portion 13, which communicates with a lateral delivery port 14, in which may be placed a throttle valve 15. Piercing the disk of the throttle valve at its lowest point is a hole 16, which prevents any damming up of liquid gasolene in the outlet 14 when the throttle valve is closed or nearly so.

A gasolene bowl 21 surrounds and is mounted on the lower end of the main body 10, being pressed upward against the flange 22 on said main body by a nut 23. An air inlet compartment 24, which may be provided with an air control valve 25 and a drain 26, is mounted on the main body 10 below the nut 23. Both the air inlet compartment 24 and the gasolene bowl 21 may be swung around the vertical axis of the main body 10 to any desired position, the air inlet compartment being clamped in such a position by a clamping screw 27. The gasolene in the bowl 21 is kept at a substantially constant level by a float 28 operating a valve 29 which controls the gasolene inlet 30 fed from any suitable source of gasolene supply. The float is conveniently an annulus. The level of the gasolene in the bowl 21 is slightly below the contracted portion 12 of the passageway 11. There is a communication between this contracted portion and the gasolene in the bowl, preferably by a plurality of passages 35 and 36 drilled or otherwise formed in the main body 10. One of these passages as 35, but preferably not all of them, may be adjustable by a needle valve 37, which may be held in adjusted position by a spring pressed ball 38.

In the top of the main body 10 is mounted a plug 40 provided with a depending socket 41. In this socket is a spring 42, on which rests a piston 43 mounted on the upper end of a rod 44. On the lower end of this rod is a tapered bob 45, and fixed on the rod 44 above the bob 45 is a disk 46. Both the bob 45 and the disk 46 are below the lower end of the socket 41, the upper end of which may be closed, if desired, by a cap 47. The piston 43 in its socket 41 forms a dash pot.

The weight of the bob 45 and the disk 46 is such that when no air is passing through the carbureter they hang in the position shown in dotted lines, the spring 42 then being compressed to its minimum travel. In this position, which is assumed when the engine is at rest or operating at a low speed, the disk 46 is at the lower or smaller end of the frusto conical portion 10, which is nearly closed thereby, and the largest part of the bob 45 is in the contracted portion 12 of the passage-way 11, which also is then nearly closed. Any air now demanded by the engine has to pass around the edges of the bob 45 and the disk 46; and does so, because of the small area for passage, with a considerable velocity. On account of this velocity, gasolene from the bowl 21 is drawn through the passages 35 and 36 and mixed with the passing air to form a proper explosive mixture. As the speed of the engine increases and more of the explosive mixture is demanded the pressure above the disk 46 is diminished so that the excess of pressure below such disk lifts the latter and thus increases the area of passage around such disk and the bob 45. As a result, the air passes the inner ends of the passages 35 and 36 in a thick layer, and at a velocity which, though usually numerically higher than before is somewhat lower in proportion to the volume of gas delivered. The position taken by the disk 46 and bob 45 depends on the speed of the engine and the consequent demand on the carbureter, the upper limiting position being shown in the full lines, in which position a practically unrestricted passage of the air is permitted.

My invention is not limited to the precise arrangement shown, but is capable of considerable modification. I therefore aim to cover all modifications of my invention which do not involve a departure from the spirit and scope of my invention as set forth in the following claims.

What I claim is:—

1. A carbureter comprising a member having a vertical air passage-way the upper end of which flares upward, a gasolene bowl communicating with said passage-way below said flaring portion, a disk movable axially of said flaring portion in and beyond the upper end of the latter, and a bob carried by said disk and by its vertical movement varying the area for the passage of air in the passage-way at the point where it communicates with the gasolene bowl, said disk being movable along said flared portion of the passage-way by the difference in pressure on its two sides.

2. A carbureter comprising a member having a vertical air passage-way the upper end of which flares upward, a gasolene bowl communicating with said passage-way below said flaring portion, a disk movable axially of said flaring portion, and a bob carried by said disk and by its vertical movement varying the area for the passage of air in the passage-way at the point where it communicates with the gasolene bowl, said disk being movable along said flared portion of the passage-way by the difference in pressure on its two sides, and a spring for carrying part of the weight of the disk and bob.

3. In a carbureter, the combination of a member having a vertical passage-way which is restricted at an intermediate portion of its length and at its upper end terminates in an inverted frustum, a gasolene bowl, said member being provided with passages which lead from said gasolene bowl to said restricted portion of the passage-way, a tapered bob movable axially along said passage-way from said restricted portion upward, and a member mechanically connected to said bob and suspended so as to be movable in and beyond the upper end of said frustum.

4. A carbureter having a vertical mixing passage-way and a lateral delivery port, in combination with a throttle valve located in said delivery port and provided with an opening at the bottom for preventing the damming up of liquid behind it.

5. A carbureter having a vertical mixing passage-way and a lateral delivery port, said delivery port being fed downwardly from the upper end of the mixing passage-way, in combination with a throttle valve located in said delivery port and provided with an opening at the bottom for preventing the damming up of liquid behind it.

6. In a carbureter, the combination of a member having a vertical air passage-way which flares in smooth curves both upwardly and downwardly from an intermediate contracted portion and at its upper end has the shape of an inverted frustum of which the sides are tapered less sharply than those of the portion between it and the contracted portion, a gasolene bowl, said member being provided with passages which lead from said gasolene bowl to said restricted portion of the passage-way, a tapered bob movable axially along said passage-way from said restricted portion upward, and a member mechanically connected to said bob and suspended so as to be movable in said frustum along the axis thereof.

7. In a carbureter, the combination of a member having a vertical air passage-way which flares both upwardly and downwardly from an intermediate contracted portion and at its upper end has the shape of an inverted frustum of which the sides are tapered less sharply than those of the portion between it and the contracted portion, a gasolene bowl, said member being provided with passages which lead from said gasolene bowl to said restricted portion of the passage-way, a tapered bob movable axially along said passage-way from said restricted portion upward, and a member mechanically connected to said bob and suspended so as to be movable in said frustum along the axis thereof.

8. A carbureter comprising a member having a vertical air passage-way the upper end of which flares upward, a gasolene bowl communicating with said passage-way below said flaring portion, a disk movable axially of said flaring portion, a rod projecting from the lower side of the said disk, and a bob carried on the lower end of said rod and by its vertical movement varying the area for the passage of air in the passage-way at the point where it communicates with the gasolene bowl, said bob and said disk both nearly closing said passage-way when the disk is in its lowermost position, and said disk being movable along said flared portion of the passage-way by the difference in pressure on its two sides.

In witness whereof, I, have hereunto set my hand and seal at Indianapolis, Indiana, this eighteenth day of October, A. D. one thousand nine hundred and eleven.

CHARLES P. GRIMES. [L. S.]

Witnesses:
FRANK A. FAHLE,
G. B. SCHLEY.